(12) United States Patent
Yamanaka

(10) Patent No.: US 6,551,370 B2
(45) Date of Patent: Apr. 22, 2003

(54) METHOD OF GROWING RICE PLANTS AND GERMINATED BROWN RICE

(76) Inventor: Senya Yamanaka, 39-128, Marunouchi, Ueno-shi, Mie-ken (JP), 518-0873

( * ) Notice: Subject to any disclaimer, the term of this patent is extended or adjusted under 35 U.S.C. 154(b) by 0 days.

(21) Appl. No.: 09/925,543

(22) Filed: Aug. 10, 2001

(65) Prior Publication Data

US 2003/0019265 A1 Jan. 30, 2003

(30) Foreign Application Priority Data

Jul. 26, 2001 (JP) ......................................... 2001-225536

(51) Int. Cl.⁷ .............................. C05D 5/00; C05D 9/02; C05D 11/00
(52) U.S. Cl. ........................................................ 71/31
(58) Field of Search ............................................. 71/31

(56) References Cited

U.S. PATENT DOCUMENTS

RE33,976 E  *  6/1992  Nishikawa et al. ............ 71/92
6,387,145 B1  *  5/2002  Miele et al. ...................... 71/6

FOREIGN PATENT DOCUMENTS

JP          10152681       *   6/1998

* cited by examiner

*Primary Examiner*—Chhaya D. Sayala
(74) *Attorney, Agent, or Firm*—Wenderoth, Lind & Ponack, L.L.P.

(57) ABSTRACT

A mineral fertilizer extracted from seawater is used in a paddy planted with rice plants, and by a delicate balance between abundant elements and trace elements as mineral components therein, exerts good influence on growth of the rice plants thereby permitting the plants to grow without loosing the nutritional balance, improving resistance to insects causing damage to crops, allowing the rice plants to grow satisfactorily, and eliminating spraying of agrochemicals.

1 Claim, No Drawings

METHOD OF GROWING RICE PLANTS AND GERMINATED BROWN RICE

BACKGROUND OF THE INVENTION

1. Field of the Invention

This invention relates to a method of growing rice plants and germinated brown rice.

2. Description of the Related Art

Nitrogen, phosphorus and potassium (three fertilizer elements) are essential for growth of rice plants. Along with these elements, there are elements playing an important role in growth of rice plants. Such elements are minerals.

The minerals include abundant elements and trace elements such as silicon, calcium and magnesium, and with a delicate balance therebetween, exert a great influence on growth of rice plants.

Rice plants deficient in these minerals lose a nutritional balance to fall unhealthy, thus necessitating a spray of agrochemicals.

People often say "tasty" and "tasteless", and it is said that such "tasty" and "tasteless" are affected greatly by the content of amino acids such as glutamic acid and inosinic acid.

For generating such amino acids in rice plants, the minerals are necessary as well.

Accordingly, the object of this invention is to provide a method of growing rice plants without the need to spray agrochemicals by using a mineral fertilizer essential for growth of rice plants, as well as germinated brown rice.

SUMMARY OF THE INVENTION

To solve the problem described above, this invention provides a method of growing rice plants, which comprises using a mineral fertilizer in a paddy planted with rice seedlings.

Further, the mineral fertilizer makes use of the one extracted from seawater.

In addition, the germinated brown rice is provided by using a mineral fertilizer in a paddy planted with rice seedlings and germinating the harvested brown rice by an appropriate means.

DETAILED DESCRIPTION OF THE INVENTION

In the first aspect of this invention, rice seedlings grown in a seedbed by a known means are planted in a paddy by a rice-planting machine.

Then, the mineral fertilizer is used in the paddy planted with rice seedlings.

The said mineral fertilizer may also be used before rice seedlings are planted. That is, the mineral fertilizer is used before and after rice seedlings are planted, and by use thereof after planting, the efficiency of absorption of the mineral fertilizer into rice plants is increased.

The amount of the said mineral fertilizer is around 100 kg every 10 ares.

The said mineral fertilizer includes:
boron,
manganese,
iodine,
copper,
zinc,
molybdenum,
nickel, and
chromium.

For example, these elements are extracted from rock salts, ores and seawater or the like, and the extracted minerals are mixed with fillers such as soil, kneaded, granulated and sprayed on a paddy.

By use of the abundant elements in the mineral fertilizer in a paddy, the mineral fertilizer is absorbed into rice plants by virtue of the synergistic effect of many kinds of trace elements, and by the function of trace elements, amino acids are also formed in the rice plants.

The mineral fertilizer is helpful in forming such amino acids, thus significantly contributing to harvest of "tasty" rice (brown rice).

Naturally, both the abundant elements and trace elements in the mineral fertilizer exert good influence with a delicate balance on growth of rice plants without loosing a nutritional balance.

As a result, it becomes needless to spray agrochemicals harming the human body.

That is, rice plants grow satisfactorily without having the influence of insects causing damage to crops.

In the second aspect of this invention, the mineral fertilizer is extracted from seawater.

The mineral fertilizer thus extracted from seawater contains minerals in good balance. This is because the flowing water from riversides into the sea contains minerals from each of mountains and rivers.

In the third aspect of this invention, the brown rice harvested in the first aspect of this invention is germinated in a known means to give germinated brown rice.

The resulting germinated brown rice demonstrates an effect that is splendid (also medically) by the synergistic action between brown rice that is "tasty" due to the help of the mineral fertilizer in growth of amino acids as shown in the first aspect and the effect accompanying the germination of the brown rice, which is unique to the germinated brown rice.

That is, when the brown rice from the rice plants harvested in the first aspect is germinated and eaten, the degree of absorption of abundant minerals contained in the brown rice is significantly increased and the unique efficiency possessed by the germinated brown rice is further improved by germination of the brown rice.

The primary factor thereof is that the content of "γ-aminobutyric acid" (generally called GABA) in the germinated brown rice is about 1.6 times as high as that in brown rice and about 10 times as high as that in polished rice.

Ingestion of this GABA is improved owing to the brown rice using the mineral fertilizer, thus demonstrates an excellent effect on promotion of human health.

The rice plants have the function of storing minerals in them. In addition, brown rice contains phytic acid in an amount as large as about 1%.

Because brown rice has the action of preventing the human body from absorbing minerals, a metabolic defect in calcium is found in a brown rice meal.

Germinated brown rice finishes fulfilling the original role of preventing release of minerals for species storage, and phytic acid is decomposed by the action of a phytase into phosphorus and inositol.

As a result, the minerals can be absorbed without any obstacle.

According to the method of growing rice plants in the present invention as described above, the minerals used in the fertilizer for growth of rice seedlings are absorbed into rice plants, and by the action of trace elements therein, allow amino acids to be formed in the rice, thus contributing greatly to harvest of "tasty" rice (brown rice) and by a delicate balance between the abundant elements and trace elements in the mineral fertilizer, exert good influence on growth of rice plants without loosing the nutritional balance, thus resulting in elimination of spraying of agrochemicals harming the human body and leading to an increase in yield at an early stage.

Further, the mineral fertilizer is extracted from seawater and can thus contain minerals with good balance.

In addition, the harvested brown rice is germinated thereby demonstrating an effect that is splendid (also medically) by the synergistic action between brown rice that is "tasty" due to the help of the mineral fertilizer in growth of amino acids and the effect accompanying the germination of the brown rice, which is unique to the germinated brown rice.

What is claimed is:

1. A method of growing rice plants, which comprises using a mineral fertilizer in a paddy planted with rice seedlings, wherein the mineral fertilizer has been extracted from seawater.

* * * * *